US011945923B2

(12) United States Patent
Kubo et al.

(10) Patent No.: US 11,945,923 B2
(45) Date of Patent: Apr. 2, 2024

(54) CONDUCTIVE POLYMER DISPERSION LIQUID, ELECTROLYTIC CAPACITOR, AND METHOD FOR PRODUCING ELECTROLYTIC CAPACITOR

(71) Applicant: PANASONIC INTELLECTUAL PROPERTY MANAGEMENT CO., LTD., Osaka (JP)

(72) Inventors: Daisuke Kubo, Osaka (JP); Hiroyuki Arima, Osaka (JP); Tomoyuki Tashiro, Yamaguchi (JP); Kazuhiro Takatani, Hyogo (JP); Kenta Chashiro, Osaka (JP); Shumpei Matsushita, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 251 days.

(21) Appl. No.: 17/427,530

(22) PCT Filed: Jan. 29, 2020

(86) PCT No.: PCT/JP2020/003112
§ 371 (c)(1),
(2) Date: Jul. 30, 2021

(87) PCT Pub. No.: WO2020/158783
PCT Pub. Date: Aug. 6, 2020

(65) Prior Publication Data
US 2022/0162404 A1    May 26, 2022

(30) Foreign Application Priority Data

Jan. 31, 2019  (JP) .................... 2019-016512
Jan. 31, 2019  (JP) .................... 2019-016513

(51) Int. Cl.
*C08J 5/18* (2006.01)
*C08J 5/04* (2006.01)
(Continued)

(52) U.S. Cl.
CPC ............... *C08J 5/18* (2013.01); *C08J 5/045* (2013.01); *C08J 5/046* (2013.01); *H01G 9/0032* (2013.01);
(Continued)

(58) Field of Classification Search
CPC ..... C08J 5/18; C08J 5/045; C08J 5/046; C08J 2365/00; C08J 2401/02; C08J 2433/26;
(Continued)

(56) References Cited

U.S. PATENT DOCUMENTS 6,519,137 B1   2/2003 Nitta et al.
2008/0002334 A1  3/2008 Werner et al.
(Continued)

FOREIGN PATENT DOCUMENTS

CN   101106021 A   1/2008
CN   101379138 A   3/2009
(Continued)

OTHER PUBLICATIONS

International Search Report and Written Opinion issued in International Patent Application No. PCT/JP2020/003112, dated Apr. 14, 2020; with partial English translation.
(Continued)

*Primary Examiner* — Dion R. Ferguson
(74) *Attorney, Agent, or Firm* — Rimon P.C.

(57) ABSTRACT

Disclosed is a method for producing an electrolytic capacitor, the method including the steps of preparing an anode foil that includes a dielectric layer, a cathode foil, and a fiber structure; preparing a conductive polymer dispersion liquid that contains a conductive polymer component and a dis-
(Continued)

persion medium; producing a separator by applying the conductive polymer dispersion liquid to the fiber structure and then removing at least a portion of the dispersion medium; and producing a capacitor element by sequentially stacking the anode foil, the separator, and the cathode foil. The dispersion medium contains water. The fiber structure contains a synthetic fiber in an amount of 50 mass % or more. The fiber structure has a density of 0.2 g/cm$^3$ or more and less than 0.45 g/cm$^3$.

22 Claims, 4 Drawing Sheets

(51) Int. Cl.
*H01G 9/00* (2006.01)
*H01G 9/02* (2006.01)

(52) U.S. Cl.
CPC ............ *H01G 9/02* (2013.01); *C08J 2365/00* (2013.01); *C08J 2401/02* (2013.01); *C08J 2433/26* (2013.01); *C08J 2467/02* (2013.01); *C08J 2477/00* (2013.01)

(58) Field of Classification Search
CPC . C08J 2467/02; C08J 2477/00; H01G 9/0032; H01G 9/02; H01G 9/028; H01G 9/15; C08L 25/18; C08L 65/00; C08L 101/12
See application file for complete search history.

(56) References Cited

U.S. PATENT DOCUMENTS

| | | |
|---|---|---|
| 2009/0021894 A1 | 1/2009 | Ning et al. |
| 2009/0144954 A1 | 6/2009 | Furusawa et al. |
| 2011/0080690 A1 | 4/2011 | Ning et al. |
| 2011/0119879 A1 | 5/2011 | Ishimaru |
| 2013/0027847 A1 | 1/2013 | Aoyama et al. |
| 2013/0059064 A1 | 3/2013 | Majima et al. |
| 2013/0294013 A1 | 11/2013 | Ning et al. |
| 2014/0237785 A1 | 8/2014 | Aoyama et al. |
| 2018/0047511 A1 | 2/2018 | Tsuda |
| 2018/0047521 A1 | 2/2018 | Tsuda |
| 2019/0259541 A1 | 8/2019 | Tsuda |
| 2020/0006010 A1 | 1/2020 | Tsuda |
| 2020/0266004 A1 | 8/2020 | Tsuda |
| 2020/0321162 A1 | 10/2020 | Tsuda |
| 2021/0098199 A1 | 4/2021 | Tsuda |
| 2021/0343480 A1 | 11/2021 | Tsuda |
| 2022/0102082 A1* | 3/2022 | Kubo ...................... H01G 9/15 |
| 2022/0162404 A1* | 5/2022 | Kubo ..................... C08L 65/00 |
| 2022/0359127 A1* | 11/2022 | Aoyama ................ H01G 9/035 |

FOREIGN PATENT DOCUMENTS

| | | | |
|---|---|---|---|
| CN | 102959659 A | 3/2013 | |
| CN | 107533922 A | 1/2018 | |
| CN | 107533923 A | 1/2018 | |
| JP | 2002-203750 A | 7/2002 | |
| JP | 2006-287182 A | 10/2006 | |
| JP | 2010-129651 A | 6/2010 | |
| JP | 2011-082313 A | 4/2011 | |
| JP | 2011-109024 A | 6/2011 | |
| JP | 2011-199088 A | 10/2011 | |
| JP | 2011199088 A * | 10/2011 | ............ H01G 11/48 |
| JP | 2014-093417 A | 5/2014 | |
| JP | 2014-148631 A | 8/2014 | |
| JP | 2014148631 A * | 8/2014 | |
| JP | 2015-118978 A | 6/2015 | |
| JP | 2015-207573 A | 11/2015 | |
| JP | 2016-004914 A | 1/2016 | |
| JP | 2017-174928 A | 9/2017 | |
| TW | 468189 B | 12/2001 | |
| WO | 2008/029695 A1 | 3/2008 | |
| WO | WO-2021166927 A1 * | 8/2021 | ........... H01G 9/0036 |

OTHER PUBLICATIONS

Japanese Office Action dated Oct. 3, 2023 issued in the corresponding Japanese Patent Application No. 2020-569673.
Chinese Office Action dated Nov. 13, 2023 issued in the corresponding Chinese Patent Application No. 202080011830.8, with English translation of the Search Report.
功能材料, , 09 Sep. 20, 2005 汪斌华等 浸渍条件 第 1377-1379 頁.

* cited by examiner

CONDUCTIVE POLYMER DISPERSION LIQUID, ELECTROLYTIC CAPACITOR, AND METHOD FOR PRODUCING ELECTROLYTIC CAPACITOR

CROSS-REFERENCE OF RELATED APPLICATIONS

This application is the U.S. National Phase under 35 U.S.C. § 371 of International Patent Application No. PCT/JP2020/003112, filed on Jan. 29, 2020, which in turn claims the benefit of Japanese Application No. 2019-016512, filed on Jan. 31, 2019 and Japanese Application No. 2019-016513, filed on Jan. 31, 2019, the entire disclosures of which Applications are incorporated by reference herein.

TECHNICAL FIELD

The present invention relates to a conductive polymer dispersion liquid, an electrolytic capacitor, and a method for producing an electrolytic capacitor, and more specifically to an improvement in ESR characteristics.

BACKGROUND ART

Capacitors for use in electronic devices are required to have a high capacitance and a low equivalent series resistance (ESR) in a high frequency range. An electrolytic capacitor in which a conductive polymer such as polypyrrole, polythiophene, polyfuran, or polyaniline is used as a solid electrolyte is expected to be promising as a high capacitance capacitor with a low ESR. Patent Literature 1 discloses a method in which a conductive polymer is attached to an anode foil by immersing the anode foil in a dispersion liquid that contains the conductive polymer. Patent Literature 2 discloses a method in which a conductive polymer is attached to a separator by immersing the separator in a dispersion liquid that contains the conductive polymer. By using the immersion methods described above, the conductive polymer can be provided in the same manner as an electrolytic solution without requiring large equipment.

CITATION LIST

Patent Literatures

Japanese Laid-Open Patent Publication No. 2011-109024
Japanese Laid-Open Patent Publication No. 2015-207573

SUMMARY OF INVENTION

Technical Problem

In recent years, in addition to a system (full hybrid system) that is self-movable by using only an electric motor, attention has been given to a system called "mild hybrid system" that is a type of hybrid car. In the mild hybrid system, an alternator that is normally mounted on a passenger car is used as an engine assisting motor. In Europe, the LV148 standards that are standards for power supply have been set in which the rated voltage of an alternator mounted on a passenger car is set to 12 V to 48 V, and development has been made for practical use of the mild hybrid system.

When an alternator is configured to provide a higher voltage, an increased amount of ripple current flows through an electrolytic capacitor that is used together with the alternator. In order to suppress heat generation caused by the increased amount of ripple current, it is effective to use a method that reduces the equivalent series resistance (ESR) of the electrolytic capacitor. The amount of the conductive polymer may be increased to reduce the ESR.

However, with the method described above, it is not possible to attach a sufficient amount of the conductive polymer to a capacitor element. For example, when the concentration of the conductive polymer is increased, the viscosity of the dispersion liquid that contains the conductive polymer also increases, which makes it difficult to cause the dispersion liquid to permeate into the inside of the capacitor element. Accordingly, as a result, the amount of the conductive polymer attached to the capacitor element cannot be increased significantly.

Also, it is difficult to uniformly attach the conductive polymer to a separator.

Solution to Problem

In a first embodiment of the present invention, a first aspect relates to a method for producing an electrolytic capacitor, the method including the steps of: preparing an anode foil that includes a dielectric layer, a cathode foil, and a fiber structure; preparing a conductive polymer dispersion liquid that contains a conductive polymer component and a dispersion medium; producing a separator by applying the conductive polymer dispersion liquid to the fiber structure and then removing at least a portion of the dispersion medium; and producing a capacitor element by sequentially stacking the anode foil, the separator, and the cathode foil, wherein the dispersion medium contains water, the fiber structure contains a synthetic fiber in an amount of 50 mass % or more, and the fiber structure has a density of 0.2 g/cm$^3$ or more and less than 0.45 g/cm$^3$.

In the first embodiment of the present invention, a second aspect relates to a method for producing an electrolytic capacitor, the method including the steps of: preparing an anode foil that includes a dielectric layer, a cathode foil, and a fiber structure; preparing a conductive polymer dispersion liquid that contains a conductive polymer component and a dispersion medium; producing a separator by applying the conductive polymer dispersion liquid to the fiber structure and then removing at least a portion of the dispersion medium; and producing a capacitor element by sequentially stacking the anode foil, the separator, and the cathode foil, wherein the dispersion medium contains water, the fiber structure contains 40 mass % or more of a cellulose fiber and a paper strengthening agent, and the fiber structure has a density of 0.2 g/cm$^3$ or more and less than 0.45 g/cm$^3$.

In the first embodiment of the present invention, a third aspect relates to an electrolytic capacitor including: an anode foil that includes a dielectric layer; a cathode foil; and a separator that is interposed between the anode foil and the cathode foil, wherein the separator contains a fiber structure and a conductive polymer component that is attached to the fiber structure, the fiber structure contains a synthetic fiber in an amount of 50 mass % or more, and the fiber structure has a density of 0.2 g/cm$^3$ or more and less than 0.45 g/cm$^3$.

In the first embodiment of the present invention, a fourth aspect relates to an electrolytic capacitor including: an anode foil that includes a dielectric layer; a cathode foil; and a separator that is interposed between the anode foil and the cathode foil, wherein the separator contains a fiber structure and a conductive polymer component that is attached to the fiber structure, the fiber structure contains 40 mass % or more of a cellulose fiber and a paper strengthening agent, and the fiber structure has a density of 0.2 g/cm$^3$ or more and less than 0.45 g/cm$^3$.

In a second embodiment of the present invention, a first aspect relates to a conductive polymer dispersion liquid that is applied to a sheet-like member that constitutes a capacitor element by using a coating method, the conductive polymer dispersion liquid including: a conductive polymer component; and a dispersion medium, wherein the conductive polymer component is contained in an amount of 3 mass % or more and 15 mass % or less, and the conductive polymer dispersion liquid has a viscosity of 100 mPa·s or more, the viscosity being measured at room temperature by using a vibration viscometer.

In the second embodiment of the present invention, a second aspect relates to a method for producing an electrolytic capacitor, the method including the steps of: preparing sheet-like members that constitute a capacitor element; preparing a first conductive polymer dispersion liquid that contains a first conductive polymer component and a first dispersion medium, wherein the first conductive polymer component is contained in an amount of 3 mass % or more and 15 mass % or less, and the first conductive polymer dispersion liquid has a viscosity of 100 mPa·s or more, the viscosity being measured at room temperature by using a vibration viscometer; forming a conductive polymer layer that contains the first conductive polymer component by applying the first conductive polymer dispersion liquid to the sheet-like member by using a coating method and then removing at least a portion of the first dispersion medium; and producing a capacitor element by using the sheet-like member on which the conductive polymer layer has been formed.

In the second embodiment of the present invention, a third aspect relates to an electrolytic capacitor including a capacitor element that includes: an anode foil that includes a dielectric layer; a cathode foil; and a separator that is interposed between the anode foil and the cathode foil, wherein a conductive polymer layer that contains a first conductive polymer component is formed on at least one selected from the group consisting of the anode foil, the cathode foil, and the separator, and a mass of the conductive polymer layer per unit area is 0.04 mg/cm$^2$ or more.

Advantageous Effects of Invention

According to the first embodiment of the present invention, the occurrence of wrinkles in the separator is suppressed, and it is therefore possible to uniformly attach a sufficient amount of the conductive polymer to the separator.

According to the second embodiment of the present invention, the capacitor element can hold a large amount of the conductive polymer. Accordingly, it is possible to obtain an electrolytic capacitor with a reduced ESR.

Novel features of the present invention are set forth in the appended claims. However, the present invention will be well understood from the following detailed description of the present invention with reference to the drawings, in terms of both the configuration and the content together with other objects and features of the present invention.

DESCRIPTION OF EMBODIMENTS

Figure 1:
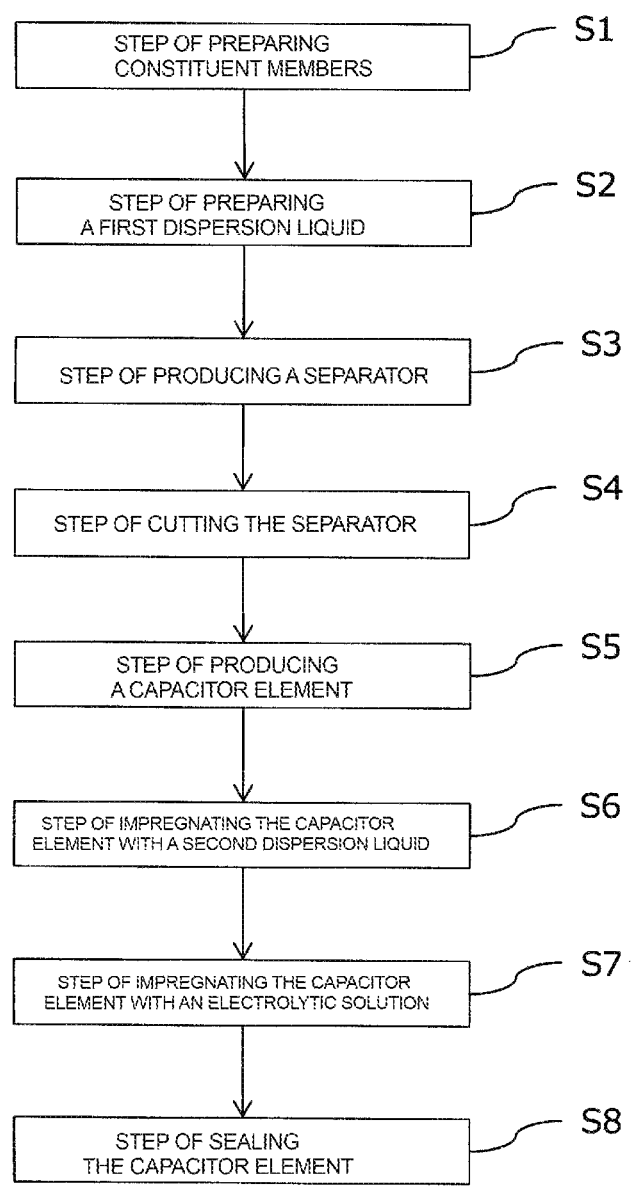
FIG. 1 is a flowchart illustrating an example of a method for producing an electrolytic capacitor according to a first embodiment of the present invention.

Increasing the amount of the conductive polymer can be implemented by the first embodiment that is characterized by the separator and/or the second embodiment that is characterized by the conductive polymer dispersion liquid.

A. First Embodiment

Separators for electrolytic capacitors are ordinarily made of cellulose. The reason is that cellulose is low cost and can hold a large amount of an electrolytic solution. Cellulose has a hydroxy group, and thus is likely to swell with water. For this reason, when a cellulose is brought into contact with a conductive polymer that has been dispersed in water, wrinkles occur instantly. It is therefore difficult to uniformly attach the conductive polymer to the separator made of cellulose. Furthermore, swollen cellulose is likely to shrink during drying processing that is subsequently performed, and thus new wrinkles may occur. When the thickness of the separator becomes non-uniform due to wrinkles, withstand voltage and inter-electrode resistance may vary from place to place in the electrolytic capacitor.

In the present embodiment, water, which is easy to handle, is used as the dispersion medium for dispersing the conductive polymer component, and a fiber structure that contains a synthetic fiber in an amount of 50 mass % or more, or a fiber structure that contains a cellulose fiber and a paper strengthening agent is used as the raw material of the separator. With this configuration, the occurrence of wrinkles when the conductive polymer dispersion liquid is brought into contact with the fiber structure is suppressed. Accordingly, it is possible to obtain a separator to which the conductive polymer component has been uniformly attached. An electrolytic capacitor produced by using the separator has low ESR characteristics and a uniform separator thickness, and thus variations in withstand voltage and inter-electrode resistance are suppressed.

Furthermore, the amount of impurities contained in the conductive polymer component attached to the separator can be reduced as compared with the case where a polymerization reaction is performed on the surface of the separator. For this reason, the withstand voltage of the electrolytic capacitor produced by using the separator can be increased. In addition, the method for applying the conductive polymer dispersion liquid is not limited, either. It is also possible to use, for example, methods, such as a coating method and an immersion method, with which a large amount of the conductive polymer component can be applied.

That is, in the present embodiment, the occurrence of wrinkles in the separator during the production process is suppressed, and thus the method for applying the conductive polymer dispersion liquid is not limited, and a sufficient amount of the conductive polymer can be uniformly attached to the separator. As a result, the ESR of the electrolytic capacitor is further reduced, and heat resistance is also improved. Accordingly, the electrolytic capacitor according to the present embodiment is suitable for use in a product as described above through which a large amount of ripple current flows.

B. Second Embodiment

A conductive polymer dispersion liquid according to the present embodiment contains a conductive polymer component and a dispersion medium, and the conductive polymer component is contained in the conductive polymer dispersion liquid in an amount of 3 mass % or more and 15 mass % or less. The conductive polymer dispersion liquid has a viscosity of 100 mPa·s or more. By applying the high-concentration dispersion liquid to a sheet-like member (hereinafter referred to as "constituent member") that constitutes a capacitor element, the capacitor element can hold a larger amount of the conductive polymer component than ever before.

At least a portion of the conductive polymer component is attached to the surface of the constituent member. As a result of a sufficient amount of the conductive polymer component being attached to the surface of the constituent member, the ESR of the resulting electrolytic capacitor is reduced. Furthermore, the heat resistance of the electrolytic capacitor is also improved. Accordingly, the electrolytic capacitor according to the present embodiment is suitable for use in a product through which a large amount of ripple current flows.

Furthermore, the amount of impurities contained in the conductive polymer layer that has been formed can be reduced as compared with the case where a polymerization reaction is performed on the surface of the constituent member. Accordingly, it is possible to increase the withstand voltage of the electrolytic capacitor produced by using the conductive polymer layer Each embodiment will be described in detail.

A. First Embodiment

[Method for Producing Electrolytic Capacitor]

An electrolytic capacitor according to the present embodiment can be produced by using a method including the steps of: preparing an anode foil that includes a dielectric layer, a cathode foil, and a fiber structure; preparing a conductive polymer dispersion liquid that contains a conductive polymer component and a dispersion medium; producing a separator by applying the conductive polymer dispersion liquid to the fiber structure and then removing at least a portion of the dispersion medium; and producing a capacitor element by sequentially stacking the anode foil, the separator, and the cathode foil. Note that the dispersion medium contains water. The fiber structure contains a synthetic fiber in an amount of 50 mass % or more, or contains a cellulose fiber and a paper strengthening agent. In either case, the fiber structure has a density of 0.2 g/cm$^3$ or more and less than 0.45 g/cm$^3$.

FIG. 1 is a flowchart illustrating an example of a method for producing an electrolytic capacitor according to a first embodiment of the present invention.

Hereinafter, each of the steps included in the example of the method for producing an electrolytic capacitor according to the present embodiment will be described.

(1) Step of preparing an anode foil, a cathode foil, and a fiber structure (S1)

As the raw material of the anode foil and the cathode foil, for example, a metal foil that contains a valve metal is prepared.

A dielectric layer is formed on the surface of a metal foil to be used as the anode foil. The method for forming the dielectric layer is not particularly limited, and the dielectric layer can be formed by subjecting the metal foil to a chemical formation treatment. In the chemical formation treatment, for example, the metal foil is immersed in a chemical formation solution such as an ammonium adipate solution, and then heated. Alternatively, voltage may be applied to the metal foil immersed in the chemical formation solution. A dielectric layer may be formed on the surface of a metal foil to be used as the cathode foil in the same manner described above, or a conductive coating layer may be formed on the surface of a metal foil to be used as the cathode foil by sputtering or vapor deposition.

Prior to forming the dielectric layer and/or the coating layer, the surface of the metal foil may be roughened, where necessary. With the surface roughening, irregularities are formed on the surface of the metal foil. The surface roughening is preferably performed by etching the metal foil. The etching process may be performed by using, for example, a direct current electrolysis method or an alternating current electrolysis method.

(Fiber Structure)

A fiber structure is used as the raw material of the separator.

The fiber structure is not particularly limited as long as it is porous. Examples of the fiber structure include a woven fabric, a knit, and a non-woven fabric that contain fibers.

In order to prevent the occurrence of wrinkles caused by the conductive polymer dispersion liquid that contains water as the dispersion medium being attached to the fiber structure, the fiber structure contains a synthetic fiber in an amount of 50 mass % or more, or contains a cellulose fiber and a paper strengthening agent. As a result of the occurrence of wrinkles in the fiber structure being suppressed, the conductive polymer dispersion liquid (hereinafter referred to as "first dispersion liquid") is uniformly attached to the fiber structure, and the resulting separator has a uniform thickness. For this reason, in the electrolytic capacitor, the likelihood of the withstand voltage and inter-electrode resistance varying from place to place is suppressed.

In the fiber structure (hereinafter referred to as "first fiber structure") that contains a synthetic fiber in an amount of 50 mass % or more, the amount of the synthetic fiber may be 70 mass % or more of the fiber structure. The type of synthetic fiber is not particularly limited. From the viewpoint of strength and unlikeliness of swelling with water, the synthetic fiber may contain at least one selected from the group consisting of a nylon fiber, an aramid fiber, an acrylic fiber, and a polyester fiber.

The first fiber structure may further contain cellulose from the viewpoint of having good affinity for a first dispersion liquid, an electrolytic solution that is also added where necessary, and a second conductive polymer dispersion liquid (hereinafter referred to as "second dispersion liquid"), which will be described later. Considering the ability of holding the electrolytic solution, the amount of cellulose may be 10 mass % or more of the fiber structure. The amount of cellulose may be less than 50 mass %, 30 mass % or less, or 20 mass % or less.

In the fiber structure (hereinafter referred to as "second fiber structure") that contains a cellulose fiber and a paper strengthening agent, the type of paper strengthening agent is not particularly limited, and a wet paper strengthening agent and/or a dry paper strengthening agent may be used. These may be used alone or in combination. As the wet paper strengthening agent, for example, at least one selected from the group consisting of a urea formaldehyde resin, a melamine formaldehyde resin, a polyamide polyamine epichlorohydrin, and a polyvinylamine can be used. As the dry paper strengthening agent, for example, at least one selected from the group consisting of a polyacrylamide, a polyvinyl alcohol, a starch, and a carboxymethyl cellulose can be used.

The paper strengthening agent may be added to the raw material of the second fiber structure (for example, a slurry that contains a cellulose fiber), or applied to the second fiber structure by spraying or the like.

In the case where the paper strengthening agent is added, the second fiber structure may contain cellulose in an amount of 40 mass % or more or 70 mass % or more. The second fiber structure may further contain a synthetic fiber. The amount of the synthetic fiber may be, for example, 10 mass % or more and 60 mass % or less of the second fiber structure.

Each fiber structure has a density of 0.2 g/cm$^3$ or more and less than 0.45 g/cm$^3$. Even when a fiber structure that has a small density is used, by containing a synthetic fiber in an amount of 50 mass % or more, or containing a cellulose fiber and a paper strengthening agent, swelling of the fiber structure with the water dispersion medium is suppressed. The density of the fiber structure (including the paper strengthening agent) may be, for example, 0.25 g/cm$^3$ or more and 0.40 g/cm$^3$ or less.

The thickness of each fiber structure is not particularly limited. The thickness of each fiber structure may be, for example, 20 µm or more and 100 µm or less, and is preferably 30 µm or more and 60 µm or less. With this configuration, in the resulting electrolytic capacitor, the short circuiting is likely to be suppressed, and the effect of reducing the ESR can be further improved.

(2) Step of Preparing a First Dispersion Liquid (S2)

A first dispersion liquid that contains a first conductive polymer component (hereinafter referred to as "first polymer component") and a first dispersion medium is prepared.

(First Dispersion Liquid)

The first dispersion liquid contains a first polymer component and a first dispersion medium.

The first polymer component contains a conductive polymer. Examples of the conductive polymer include polypyrrole, polythiophene, polyfuran, polyaniline, polyacetylene, polyphenylene, polyphenylene vinylene, polyacene, polythiophene vinylene, and the like. These may be used alone or in a combination of two or more, or a copolymer that contains two or more types of monomers may be used.

In the specification of the present application, each of polypyrrole, polythiophene, polyfuran, polyaniline, and the like means a polymer in which polypyrrole, polythiophene, polyfuran, polyaniline, or the like is used as the basic backbone. Accordingly, polypyrrole, polythiophene, polyfuran, polyaniline, and the like may also include derivatives thereof. For example, polythiophene includes poly(3,4-ethylenedioxythiophene), and the like.

The first polymer component may further contain a dopant. The dopant may be a polyanion. Specific examples of the polyanion include polyvinyl sulfonic acid, polystyrene sulfonic acid, polyallyl sulfonic acid, polyacrylic sulfonic acid, polymethacryl sulfonic acid, poly(2-acrylamide-2-methylpropane sulfonic acid), polyisoprene sulfonic acid, polyacrylic acid, and the like. These may be used alone or in a combination of two or more. Also, they may be a polymer that contains sole monomers, or a copolymer that contains two or more types of monomers. Among these, it is preferable to use a polystyrene sulfonic acid-derived polyanion.

The weight-average molecular weight of the polyanion (hereinafter referred to as "first polyanion") contained in the first polymer component is not particularly limited. The weight-average molecular weight of the first polyanion may be, for example, 1,000 or more and 200,000 or less. The first polymer component that contains the first polyanion is likely to be homogeneously dispersed in the first dispersion medium and attached to the separator. Also, the weight-average molecular weight of the first polyanion may be 1,000 or more and 70,000 or less. Even when a large amount of the first polyanion is contained, an excessive increase in the viscosity of the first dispersion liquid is suppressed, and the amount of the first polymer component that is attached to the separator is likely to increase.

The first polymer component is dispersed in the first dispersion medium in the form of, for example, particles. The average particle size of the particles of the first polymer component is not particularly limited, and can be adjusted as appropriate according to the polymerization conditions, the dispersion conditions, and the like. For example, the average particle size of the particles of the first polymer component may be 0.01 µm or more and 0.5 µm or less. As used herein, the term "average particle size" refers to the median diameter of the volume-based particle size distribution measured by using a particle size measurement apparatus that uses a dynamic light scattering method.

The first dispersion medium contains water. The first dispersion medium may contain a non-aqueous solvent. The term "non-aqueous solvent" is a general term for a liquid excluding water, and includes an organic solvent and an ionic liquid. Water may account for 50 mass % or more, 70 mass % or more, or 90 mass % or more of the first dispersion medium. As the non-aqueous solvent that is used together with water, a polar solvent (a protic solvent and/or an aprotic solvent) may be used.

Examples of the protic solvent include: alcohols such as methanol, ethanol, propanol, butanol, ethylene glycol (EG), propylene glycol, polyethylene glycol (PEG), diethylene glycol monobutyl ether, glycerin, 1-propanol, butanol, polyglycerin, sorbitol, mannitol, and pentaerythritol; formaldehyde; and the like. Examples of the aprotic solvent include: amides such as N-methylacetamide, N,N-dimethylformamide, and N-methyl-2-pyrrolidone; esters such as methyl acetate, γ-butyrolactone (γBL); ketones such as methyl ethyl ketone; ethers such as 1,4-dioxane; sulfur-containing compounds such as dimethyl sulfoxide and sulfolane (SL); carbonate compounds such as propylene carbonate; and the like.

In the case where the first dispersion medium contains an alcohol as described above (in particular, a polyhydric alcohol or a sugar alcohol), electric conductivity and the impregnation ability into the separator are likely to increase. On the other hand, polyhydric alcohols and sugar alcohols tend to swell cellulose. The fiber structure according to the present embodiment is unlikely to swell with the first dispersion medium that contains an alcohol as described above, and thus the occurrence of wrinkles is suppressed.

The first dispersion liquid can be obtained by using, for example, a method in which the particles of the first polymer component are dispersed in the first dispersion medium, a method in which precursor monomers of the first polymer component are polymerized in the first dispersion medium to produce particles of the first polymer component in the first dispersion medium, or the like.

The amount of the first polymer component is not particularly limited. The first polymer component may be contained in the first dispersion liquid in an amount of 1 mass % or more and 15 mass % or less. When the amount of the first polymer component is within this range, a sufficient amount of the first polymer component can be attached to the fiber structure. From the viewpoint of further increasing the amount of the first polymer component that is attached to the fiber structure, the amount of the first polymer component may be 3 mass % or more.

The viscosity of the first dispersion liquid is not particularly limited. The first dispersion liquid may have a viscosity of 10 mPa·s or more, the viscosity being measured at room temperature (20° C.) by using a vibration viscometer (for example, VM-100A available from Sekonic Corporation). Also, the viscosity of the first dispersion liquid measured under the conditions described above may be 100 mPa·s or more and 200 mPa·s or less. The first dispersion liquid that has a viscosity within this range is particularly suitable for use in a coating method.

(3) Step of Producing a Separator (Step of Forming a Polymer Layer (S3))

A separator that contains the first polymer component is produced by applying the first dispersion liquid to the fiber structure and then removing at least a portion of the first dispersion medium. By applying the first dispersion liquid to the fiber structure that is the raw material of the separator prior to producing the capacitor element, a sufficient amount of the first polymer component can be attached to the fiber structure. The first polymer component is attached to the surfaces of the fibers that constitute the fiber structure.

The method for applying the first dispersion liquid is not particularly limited. The fiber structure may be impregnated with the first dispersion liquid, or the first dispersion liquid may be applied to the fiber structure by using a coating method.

The coating method is a technique for applying a liquid substance to a target object by using a coater. As the coater, for example, any of known apparatuses including a gravure coater, a knife coater, a comma coater, a roll coater, a die coater, and a lip coater may be used.

The amount of the first dispersion liquid applied to the fiber structure is not particularly limited. For example, the amount of the first dispersion liquid applied to the fiber structure may be set as appropriate such that the first polymer component is attached to the fiber structure in an amount of 0.02 mg/cm$^2$ or more.

The coating process that uses the first dispersion liquid may be performed on one or both sides of the fiber structure. The coating process that uses the first dispersion liquid may be performed on the same side of the fiber structure a plurality of times. With this configuration, the amount of the first polymer component that is attached to the fiber structure can be increased. In this case, the coating process may be performed continuously a plurality of times, followed by a drying process. Alternatively, the drying process may be performed each time the coating process is performed.

From the viewpoint of mass production, the step of producing a separator may be performed on a long fiber structure. In the case where the coating process is performed on both sides of a fiber structure that is a long strip, first, the coating process is performed on one side, followed by a drying process, and then, the fiber structure is spirally wound into a roll. After that, the coating process may be performed on the other side by using the same coater or a different coater while the fiber structure is dispensed by unwinding from the roll such that the fiber structure is flipped.

From the viewpoint of increasing the amount of the conductive polymer component, the first polymer component may also be attached to a constituent member other than the separator included in the capacitor element. Particularly in the case where the first polymer component is attached to the cathode foil and the separator, it is possible to cause the capacitor element to hold a sufficient amount of the conductive polymer component without compromising the self-repairing ability of the anode foil. In the case where the first polymer component is attached to the anode foil and the separator, the adhesion between the dielectric layer formed on the anode foil and the first polymer component is improved, and thus the ESR is more likely to be reduced. The method for attaching the first polymer component to a constituent member other than the separator is not particularly limited, and an impregnation method or a coating method may be used.

The first dispersion medium may be removed by using, for example, a drying process such as heat drying or vacuum drying. The drying process is not particularly limited, and may be selected as appropriate according to the type of the first dispersion medium, the amount of the first dispersion liquid applied, and the like. At this time, the drying process may be performed such that the first dispersion medium is not completely removed. For example, the drying process may be performed such that the amount of the first dispersion medium contained in the first dispersion liquid immediately after the coating process becomes 0 mass % or more and 10 mass % or less.

In the case where the capacitor element is impregnated with a second dispersion liquid and/or an electrolytic solution in a step that is performed later, when the first polymer component is attached to the separator together with the first dispersion medium, the second dispersion liquid and/or the electrolytic solution is induced by the first dispersion medium and easily permeate into the pores of the separator. Accordingly, the anode foil and the cathode foil are more likely to come into contact with the second dispersion liquid and/or the electrolytic solution, as a result of which, an improvement in the self-repairing ability of the anode foil and an increase in the electrostatic capacitance can be expected. Furthermore, cracking is unlikely to occur in the first polymer component even when the long separator to which the first polymer component has been attached is spirally wound into a roll.

(4) Step of Cutting the Separator (S4)

The long separator to which the first polymer component has been attached is cut prior to the step of producing a capacitor element. Long constituent members other than the separator may also be cut in this step, for example.

(5) Step of Producing a Capacitor Element (S5)

The anode foil and the cathode foil are stacked such that the separator is interposed between the anode foil and the cathode foil. The stacked body including the anode foil, the separator, and the cathode foil may be spirally wound. In this case, the end portion of the outermost layer of the cathode foil is fixed by using a fixing tape. In the case where the cutting step was performed, in order to form a dielectric layer on the cut surface of the anode foil, a chemical formation treatment (a chemical reformation treatment) may be further performed on the capacitor element (6) Step of Impregnating the Capacitor Element with a Second Dispersion Liquid (S6)

Where necessary, the capacitor element may be impregnated with a second dispersion liquid that contains a second conductive polymer component (hereinafter referred to as "second polymer component") and a second dispersion medium. The method for impregnating the capacitor element with the second dispersion liquid is not particularly limited. After the capacitor element has been impregnated with the second dispersion liquid, a drying process may be performed to remove at least a portion of the second dispersion medium.

By drying the capacitor element after it has been impregnated with the second dispersion liquid, the second polymer component can be attached to the inside of the capacitor element. By incorporating the second polymer component, the electrostatic capacitance further increases, and a reduction in the ESR can be expected. The second polymer component is attached primarily to the inside of pits or the pores of the constituent members of the capacitor element (Second Dispersion Liquid)

The second dispersion liquid contains, for example, a second polymer component and a second dispersion medium.

As the second dispersion medium, the same compounds as those described for the first dispersion medium can be used.

The second polymer component is not particularly limited, and may contain a conductive polymer and a dopant that are the same as those contained in the first polymer component. The second polymer component may contain, as the dopant, a polyanion (hereinafter referred to as "second polyanion"). In this case, the weight-average molecular weight of the second polyanion is preferably higher than the weight-average molecular weight of the first polyanion contained in the first polymer component. With this configuration, the electric conductivity of the second polymer component is higher, and it is therefore possible to effectively reduce the ESR by using only a small amount. Furthermore, the viscosity of the second dispersion liquid is also reduced, and thus the impregnation ability into the capacitor element increases.

The weight-average molecular weight of the second polyanion may be, for example, 1,000 or more and 200,000 or less, or 75,000 or more and 150,000 or less.

In the second dispersion liquid, the amount of the second polymer component may be smaller than the amount of the first polymer component contained in the first dispersion liquid. Specifically, the amount of the second polymer component contained in the second dispersion liquid is preferably 0.5 mass % or more and less than 3 mass %. The viscosity of the second dispersion liquid measured at room temperature (20° C.) by using a vibration viscometer is preferably lower than the viscosity of the first dispersion liquid measured under the same conditions. The viscosity of the second dispersion liquid measured at room temperature (20° C.) by using a vibration viscometer is preferably less than 100 mPa·s.

(7) Step of Impregnating the Capacitor Element with an Electrolytic Solution (S7)

Where necessary, the capacitor element may be impregnated with an electrolytic solution. The capacitor element may be impregnated with an electrolytic solution, without performing the step of impregnating it with the second dispersion liquid. Alternatively, the capacitor element may be impregnated with an electrolytic solution after the capacitor element has been impregnated with the second dispersion liquid. By incorporating the electrolytic solution, the self-repairing ability of the dielectric layer is likely to be improved. Also, the electrolytic solution functions as a substantial cathode material, and thus the effect of increasing the electrostatic capacitance can be expected. The method for impregnating the capacitor element with the electrolytic solution is not particularly limited.

(Electrolytic Solution)

The electrolytic solution contains a solvent.

Examples of the solvent include a sulfone compound, a lactone compound, a carbonate compound, a polyhydric alcohol, and the like. Examples of the sulfone compound include sulfolane, dimethyl sulfoxide, diethyl sulfoxide, and the like. Examples of the lactone compound include γ-butyrolactone, γ-valerolactone, and the like. Examples of the carbonate compound include dimethylcarbonate (DMC), diethylcarbonate (DEC), ethyl methyl carbonate (EMC), ethylene carbonate (EC), propylene carbonate (PC), fluoroethylene carbonate (FEC), and the like. Examples of the polyhydric alcohol include: glycol compounds such as ethylene glycol (EG), diethylene glycol, triethylene glycol, propylene glycol, and polyethylene glycol (PEG); glycerin; and the like. These may be used alone or in a combination of two or more.

In particular, the solvent may contain a compound that has two or more hydroxy groups. An example of the compound that has two or more hydroxy groups is a polyhydric alcohol. The amount of the compound that has two or more hydroxy groups may be 50 mass % or more, 60 mass % or more, or 70 mass % or more of the total amount of the solvent The electrolytic solution may further contain an acid component. In the case where the first polymer component or the second polymer component contains a dopant, the acid component contained in the electrolytic solution suppresses the dedoping phenomenon of the dopant and stabilizes the conductivity of the polymer component. Also, even when the dopant is dedoped from the polymer component, the site where dedoping occurred is doped again with the acid component of the electrolytic solution, and thus the ESR is likely to be maintained at a low level.

It is desirable that the acid component contained in the electrolytic solution easily dissociates in the electrolytic solution and produces anions that can easily move in the solvent, without excessively increasing the viscosity of the electrolytic solution. Examples of the acid component include aliphatic sulfonic acids with 1 to 30 carbon atoms and aromatic sulfonic acids with 6 to 30 carbon atoms. Among the aliphatic sulfonic acids, a saturated aliphatic monosulfonic acid (for example, hexane sulfonic acid) is preferable. Among the aromatic sulfonic acids, an aromatic sulfonic acid that has, in addition to a sulfo group, a hydroxy group or a carboxy group is preferable. Specifically, oxy aromatic sulfonic acids (for example, phenol-2-sulfonic acid) and sulfo aromatic carboxylic acids (for example, p-sulfobenzoic acid, 3-sulfophthalic acid, and 5-sulfosalicylic acid) are preferable.

As another acid component, a carboxylic acid may be used. The carboxylic acid preferably includes an aromatic carboxylic acid (aromatic dicarboxylic acid) that has two or more carboxyl groups. Examples of the aromatic carboxylic acid include phthalic acid (ortho form), isophthalic acid (meta form), terephthalic acid (para form), maleic acid, benzoic acid, salicylic acid, trimellitic acid, and pyromellitic acid. Among these, the aromatic dicarboxylic acid is more preferably phthalic acid (ortho form) or maleic acid. The carboxyl groups in the aromatic dicarboxylic acid are stable, and thus do not easily cause a side reaction to proceed. Accordingly, the effect of stabilizing the conductive polymer is exhibited for a long period of time, and it is therefore advantageous for extending the service life of the electrolytic capacitor. Also, the carboxylic acid may be an aliphatic carboxylic acid such as adipic acid.

The acid component may contain a composite compound that contains an organic acid and an inorganic acid, from the viewpoint of thermal stability. Examples of the composite compound that contains an organic acid and an inorganic acid include borodisalicylic acid, borodioxalic acid, borodiglycollic acid, and the like that have high heat resistance.

The acid component may contain an inorganic acid such as boric acid, phosphoric acid, phosphorous acid, hypophosphorous acid, or phosphonic acid.

From the viewpoint of enhancing the effect of suppressing the dedoping phenomenon, the concentration of the acid component may be set to 5 mass % or more and 50 mass % or less, or 15 mass % or more and 35 mass % or less.

The electrolytic solution may contain a basic component together with the acid component. By incorporating the basic component, at least a portion of the acid component is neutralized. Accordingly, the corrosion of electrodes due to the acid component can be suppressed while increasing the concentration of the acid component. From the viewpoint of effectively suppressing dedoping, the amount of the acid component is preferably in excess of that of the basic component in terms of equivalence ratio. For example, the equivalence ratio of the acid component relative to the basic component may be 1 or more and 30 or less. The concentration of the basic component contained in the electrolytic solution may be 0.1 mass % or more and 20 mass % or less, or 3 mass % or more and 10 mass % or less.

The basic component is not particularly limited. Examples of the basic component include ammonia, a primary amine, a secondary amine, a tertiary amine, a quaternary ammonium compound, an amidinium compound, and the like. Each amine may be an aliphatic amine, an aromatic amine, a heterocyclicamine, and the like.

The electrolytic solution preferably has a pH of 4 or less, more preferably 3.8 or less, and even more preferably 3.6 or less. By setting the pH of the electrolytic solution to 4 or less, the deterioration of the polymer component is further suppressed. The pH is preferably 2.0 or more.

(8) Step of Sealing the Capacitor Element (S8)

The produced capacitor element is housed in a bottomed case. As the material of the bottomed case, a metal such as aluminum, stainless steel, copper, iron, or brass, or an alloy thereof can be used. After that, the vicinity of the opening end of the bottomed case is horizontally squeezed, and the opening end is curled and crimped onto a sealing member, and the capacitor element is thereby sealed. Finally, a cover plate is placed on the curled portion, and an electrolytic capacitor is obtained. Then, the electrolytic capacitor may be subjected to an aging process while applying the rated voltage.

[Electrolytic Capacitor]

The electrolytic capacitor according to the present embodiment includes an anode foil that includes a dielectric layer, a cathode foil, and a separator that is interposed between the anode foil and the cathode foil. The separator contains a fiber structure and a first polymer component that is attached to the fiber structure. The fiber structure contains a synthetic fiber in an amount of 50 mass % or more, and has a density of 0.2 g/cm$^3$ or more and less than 45 g/cm$^3$.

Another electrolytic capacitor according to the present embodiment includes an anode foil that includes a dielectric layer, a cathode foil, and a separator that is interposed between the anode foil and the cathode foil. The separator contains a fiber structure and a first polymer component that is attached to the fiber structure. The fiber structure contains a cellulose fiber in an amount of 40 mass % or more and a paper strengthening agent, and has a density of 0.2 g/cm$^3$ or more and less than 0.45 g/cm$^3$.

Hereinafter, constituent members other than the separator of the capacitor element and other constituent materials will be described.

(First Polymer Component)

The first polymer component is attached to the separator.

Hereinafter, a conductive polymer component that is attached to the separator and contains a first polymer component may also be referred to as "first polymer layer".

The mass of the first polymer layer per unit area of the separator is not particularly limited, and may be set as appropriate where necessary. According to the present embodiment, the first polymer layer can be attached to the separator in an amount of 0.02 mg/cm$^2$ or more. The mass of the first polymer layer may be 0.1 mg/cm$^2$ or less per unit area.

The mass of the first polymer layer can be calculated from the difference in the mass of the fiber structure between before and after the application of the first dispersion liquid. Alternatively, the mass of the first polymer layer may be calculated by analyzing the separator by using a thermogravimetric analysis method (TGA method). With the TGA method, for example, thermal change when the temperature of a specimen is increased at a fixed speed, the amount of reduction in the specimen, and the like are measured. The mass of the first polymer layer attached to the separator can be calculated based on the measured values.

The first polymer component is attached to the surfaces of the fibers that constitute the separator. For this reason, the first polymer layer may also be formed on the outer surface of the separator.

A higher effect of reducing the ESR can be obtained as the electric conductivity of the first polymer layer is higher. The electric conductivity of the first polymer layer may be, for example, 30 S/cm or more, or 300 S/cm or more. The electric conductivity of the first polymer layer is likely to be higher as the molecular weight of the conductive polymer contained is higher. The viscosity of the first dispersion liquid is likely to increase as the molecular weight of the conductive polymer increases. For this reason, the molecular weight of the conductive polymer may be set such that the viscosity of the first dispersion liquid does not increase excessively.

In the case where a first dispersion liquid that has a first polymer component concentration of 3 mass % or more is used, the electric conductivity of the first polymer layer is preferably set to, for example, 170 S/cm or less. With this configuration, an excessive increase in the viscosity of the first dispersion liquid is suppressed. In this case, the electric conductivity of the first polymer layer may be 150 S/cm or less or 120 S/cm or less. The electric conductivity of the first polymer layer is the electric conductivity of a film obtained by applying the first dispersion liquid to a substrate and then removing the first dispersion medium. The electric conductivity of the film is measured in accordance with the testing method with a four-point probe array that conforms to JIS K 7194: 1994.

(Second Polymer Component)

In the capacitor element, the second polymer component described above may be provided. By incorporating the second polymer component, the electrostatic capacitance further increases, and a further reduction in the ESR can be expected. The second polymer component may be provided by, for example, impregnating the capacitor element with the second dispersion liquid described above.

Hereinafter, a conductive polymer component that contains a second polymer component and is different from the first polymer layer may be referred to as "second polymer layer".

The second polymer layer may be attached to the inside of pits or the pores on the surface of the constituent member of the capacitor element. The second polymer layer may be attached so as to cover a portion of the first polymer layer attached to the outer surface of the separator. Furthermore, the second polymer layer may be provided in the gaps between the fibers that constitute the separator to which the first polymer layer has been attached.

The second polymer layer is provided in the capacitor element in an amount of, for example, 0.01 mg/cm$^2$ or more and less than 1 mg/cm$^2$. The amount of the second polymer layer provided is calculated in the same manner as that of the first polymer component is calculated. In the case where the separator is analyzed by using the TGA method, the amount of the second polymer layer attached to the separator can be obtained by subtracting the amount of the first polymer layer attached to the separator from the calculated amount of the two polymer layers attached to the separator. The total of the amount of the second polymer layer attached to the separator and the amount of the second polymer layer attached to other constituent members (for example, the anode foil and/or the cathode foil) calculated by using the TGA method is the amount of the second polymer layer provided in the capacitor element. By dividing the total amount of the second polymer layer provided in the capacitor element by the total value of the area of one of the main surfaces of each constituent member, the mass of the second polymer layer per unit area is obtained.

According to the present embodiment, when the separator is viewed from the normal direction of the main surface of the separator, for example, 50% or more of the area of the main surface is covered by a polymer layer. The polymer layer may include the first polymer layer and the second polymer layer. The area coverage covered by the polymer layer may be 60% or more, and is preferably 90% or more. The polymer layer may be continuous or discontinuous on the surface of the separator. The polymer layer that has such a high coverage is likely to be formed when the first dispersion liquid is applied by using a coating method. The area coverage is calculated by using the separator for use in the electrolytic capacitor that has been cut into a predetermined size. The area coverage may be calculated by binarizing an image obtained by capturing the main surface of the constituent member.

The area coverage covered by the polymer layer can be regarded as the area coverage covered by the first polymer layer. The area coverage of the surface of the separator covered by the second polymer layer is smaller than the area coverage covered by the first polymer layer. The area coverage covered by the second polymer layer is, for example, 90% or less or 60% or less.

The mass (density) of the first polymer layer attached to the separator per unit area is preferably higher than the mass (density) of the second polymer layer attached to the same per unit area. The ratio of the density of the first polymer layer relative to the density of the second polymer layer is obtained by observing a cross-section of the separator by using a scanning electron microscope (SEM) or the like. The ratio of the density of the first polymer layer relative to the density of the second polymer layer is obtained by dividing the area of the first polymer layer that is in contact with the separator by the area of a polymer layer other than the first polymer layer. The densities of the polymer layers are calculated by observing the same observation field of the same separator. Ordinarily, an interface can be observed between the first polymer layer and the second polymer layer. Accordingly, it is possible to distinguish the first polymer layer and the second polymer layer from each other. The amount, the area coverage, the density, and the like of the first polymer layer attached are calculated excluding a region of the separator on which the first polymer layer is not intentionally formed. It is desirable that the observation field has an area of 100 μm$^2$ or more.

(Anode Foil)

The anode foil is a metal foil that contains at least one of valve metals including titanium, tantalum, aluminum, and niobium. The anode foil may contain the valve metal in the form of an alloy that contains the valve metal, a compound that includes the valve metal, or the like. The thickness of the anode foil is not particularly limited, and is, for example, 15 μm or more and 300 μm or less. The thickness is the average value of measured values obtained at arbitrarily selected five points (the same applies hereinafter). The surface of the anode foil may be roughened by etching or the like.

A dielectric layer is formed on the surface of the anode foil. The dielectric layer is formed by, for example, subjecting the anode foil to a chemical formation treatment. In this case, the dielectric layer may contain an oxide of the valve metal. The dielectric layer is not limited to the configuration described above as long as it functions as a dielectric. It is desirable that the dielectric layer is also formed on each end surface of the anode foil.

(Cathode Foil)

The cathode foil is not particularly limited as long as it functions as a cathode. The cathode foil may be a metal foil. Type of metal is not particularly limited, and may be a valve metal or an alloy that contains a valve metal, as with the anode foil. The thickness of the cathode foil is not particularly limited, and may be, for example, 15 μm or more and 300 μm or less. The surface of the cathode foil may be subjected to surface roughening or chemical formation treatment where necessary.

In the case where the metal foil contains a valve metal, the metal foil may include a conductive coating layer that contains at least one selected from the group consisting of carbon and metals that have an ionization tendency lower than the valve metal. With this configuration, the acid resistance is likely to be improved. In the case where the metal foil contains aluminum, the coating layer may contain at least one selected from the group consisting of carbon, nickel, titanium, tantalum, and zirconium. Among these, from the viewpoint of cost and resistance, the coating layer may contain nickel and/or titanium.

The thickness of the coating layer is not particularly limited. The thickness of the coating layer may be, for example, 5 nm or more and 200 nm or less, or 10 nm or more and 200 nm or less. The thickness of the coating layer may be measured by using, for example, an X-ray photoelectron spectroscopy method (XPS method). The coating layer can be formed by, for example, vapor depositing or sputtering any of the metals described above on a metal foil. Alternatively, the coating layer can be formed by vapor depositing a conductive carbon material on a metal foil, or applying a carbon paste that contains a conductive carbon material to a metal foil. Examples of the conductive carbon material include graphite, hard carbon, soft carbon, carbon black, and the like.

B. Second Embodiment

[Conductive Polymer Dispersion Liquid]

The conductive polymer dispersion liquid (hereinafter referred to as "first dispersion liquid") contains a conductive polymer component (hereinafter referred to as "first polymer component") and a dispersion medium (hereinafter referred to as "first dispersion medium").

The first polymer component is contained in the first dispersion liquid in an amount of 3 mass % or more and 15 mass % or less. When the amount of the first polymer component is within this range, the viscosity of the first dispersion liquid is likely to be high. For this reason, a sufficient amount of the first polymer component can be applied to the constituent member. The amount of the first polymer component may be 10 mass % or less, or 8 mass % or less The viscosity of the first dispersion liquid measured at room temperature (20° C.) by using a vibration viscometer (for example, VM-100A available from Sekonic Corporation) is 100 mPa·s or more. Also, the viscosity of the first dispersion liquid measured under the same conditions may be 200 mPa·s or less or 180 mPa·s or less. The first dispersion liquid that has a viscosity within this range is particularly suitable for use in a coating method.

The first polymer component contains a conductive polymer. As the conductive polymer, the same as described in the first embodiment can be used.

The first polymer component may further contain a dopant. As the dopant, the same as described in the first embodiment can be used.

The first polymer component is dispersed in the first dispersion medium in the form of, for example, particles. The average particle size of the particles of the first polymer component is not particularly limited, and can be adjusted as appropriate according to the polymerization conditions, the dispersion conditions, and the like. For example, the average particle size of the particles of the first polymer component may be 0.01 μm or more and 0.5 μm or less. As used herein, the term "average particle size" refers to the median diameter of the volume-based particle size distribution measured by using a particle size measurement apparatus that uses a dynamic light scattering method.

The first dispersion medium is not particularly limited, and may be water, a non-aqueous solvent, or a mixture thereof. The non-aqueous solvent is a general term for a liquid excluding water, and includes an organic solvent and an ionic liquid. Among these, the first dispersion medium may be water from the viewpoint of ease of handling and the dispersibility of the conductive polymer component. Water may account for 50 mass % or more, 70 mass % or more, or 90 mass % or more of the first dispersion medium. As the non-aqueous solvent that can be used together with water, a polar solvent (a protic solvent and/or an aprotic solvent) may be used.

As the protic solvent, the same as described in the first embodiment can be used.

The first dispersion liquid can be obtained by using, for example, a method in which the particles of the first polymer component are dispersed in the first dispersion medium, a method in which precursor monomers of the first polymer component are polymerized in the first dispersion medium to produce particles of the first polymer component in the first dispersion medium, or the like.

The first dispersion liquid is suitable for applying the first polymer component to the constituent member of the capacitor element by using a coating method. The first dispersion liquid may be applied to the constituent member of the capacitor element by using an immersion method.

By applying the first dispersion liquid to the constituent member prior to producing the capacitor element, it is possible to uniformly attach a sufficient amount of the first polymer component to the constituent member. In the case where the constituent member is porous or has pits on the surface thereof, a portion of the first dispersion liquid may permeate into the pores of the constituent member.

When the first dispersion liquid is dried, and at least a portion of the first dispersion medium is removed after the first dispersion liquid has been applied, a conductive polymer layer (hereinafter referred to as "first polymer layer") that contains the first polymer component is formed so as to cover at least a portion of the surface of the constituent member. In other words, at least a portion of the first polymer layer is provided on the outermost surface of the constituent member.

[Method for Producing Electrolytic Capacitor]

The electrolytic capacitor according to the present embodiment can be produced by using a method including the steps of: preparing a sheet-like member that constitute a capacitor element; preparing a first dispersion liquid as described above; forming a first polymer layer that contains a first polymer component by applying the first conductive polymer dispersion liquid to the sheet-like member by using a coating method and then removing at least a portion of the first dispersion medium; and producing a capacitor element by using the sheet-like member on which the first polymer layer has been formed.

Figure 2:
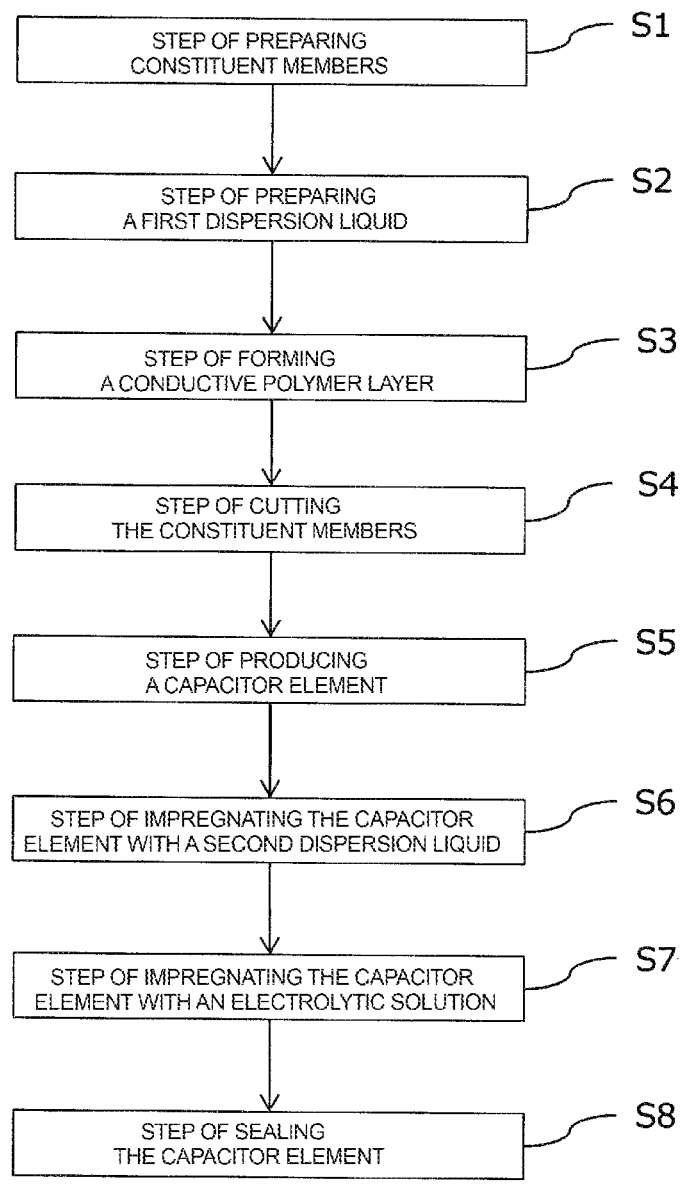
FIG. 2 is a flowchart illustrating an example of a method for producing an electrolytic capacitor according to a second embodiment of the present invention.

FIG. 2 is a flowchart illustrating an example of a method for producing an electrolytic capacitor according to a second embodiment of the present invention.

Hereinafter, each of the steps included in the example of the method for producing an electrolytic capacitor according to the present embodiment will be described.

(1) Step of Preparing Constituent Members (S1)

The sheet-like constituent members that are members to which the first dispersion liquid is to be applied may be an anode foil, a cathode foil, a separator, and the like.

The anode foil and the cathode foil are prepared in the same manner as in the first embodiment.

As the raw material of the separator, a known fiber structure may be prepared, or a fiber structure that is the same as that of the first embodiment may be prepared.

(2) Step of Preparing a First Dispersion Liquid (S2)

The above-described first dispersion liquid that contains a first polymer component and a first dispersion medium is prepared.

(3) Step of Forming a Polymer Layer (S3)

The first polymer layer that contains the first polymer component is formed by applying the first dispersion liquid to at least one selected from the group consisting of the anode foil, the cathode foil, and the separator by using a coating method, and then removing at least a portion of the first dispersion medium. As the coating method, the same as described in the first embodiment can be used. In the present embodiment, the first dispersion liquid is applied to the constituent member by using any one of known coaters listed.

From the viewpoint of increasing the amount of the first polymer component, it is desirable that the first dispersion liquid is applied to all of the constituent members.

In the case where an electrolytic solution is used together, it is desirable that the first dispersion liquid is applied to at least one or two constituent members. The reason is that it is possible to cause the capacitor element to hold a sufficient amount of the first polymer component without impeding the permeation of the electrolytic solution into other constituent members. Particularly in the case where the first polymer layer is formed on the cathode foil and/or the separator, it is possible to cause the capacitor element to hold a sufficient amount of the first polymer component without compromising the self-repairing ability of the anode foil. In the case where the first polymer layer is formed on the anode foil, the adhesion between the dielectric layer formed on the surface of the anode foil and the first polymer component is improved, and thus the ESR is more likely to be reduced.

The amount of the first dispersion liquid applied to each constituent member is not particularly limited. For example, the amount of the first dispersion liquid applied to the constituent member may be set as appropriate such that the first polymer layer is formed on the constituent member in an amount of 0.04 mg/cm$^2$ or more. In particular, the amount of the first dispersion liquid applied to the constituent member may be set as appropriate such that the first polymer layer is formed on the separator in an amount of 0.04 mg/cm$^2$ or more. The amount of the first dispersion liquid applied to each of the anode foil and the cathode foil may be set as appropriate such that the first polymer layer is formed in an amount of 0.1 mg/cm$^2$ or more. The amount of the first dispersion liquid applied is the total mass of the first polymer component that has been attached to the surface of each constituent member and the pores and pits of the constituent member per unit area.

The coating process that uses the first dispersion liquid may be performed on only one side or both sides of at least one selected from the group consisting of the anode foil, the cathode foil, and the separator. The coating process that uses the first dispersion liquid may be performed on the same side of the constituent member a plurality of times. With this configuration, the amount of the first polymer layer formed can be increased. In this case, the coating process may be performed continuously a plurality of times, followed by a drying process. Alternatively, the drying process may be performed each time the coating process is performed.

From the viewpoint of mass production, the step of forming a first polymer layer may be performed on a long constituent member. In the case where the coating process is performed on both sides of the constituent member that is a long strip, first, the coating process is performed on one side, followed by a drying process, and then, the constituent member is spirally wound into a roll. After that, that, the coating process may be performed on the other side by using the same coater or a different coater while the constituent member is dispensed by unwinding from the roll such that the constituent member is flipped.

In the case where a cutting step, which will be described later, is performed after the first polymer layer has been formed, it is desirable that the coating process is performed such that the first polymer layer is not formed on a cutting line along which the constituent member is to be cut. With this configuration, the likelihood of the first polymer layer being damaged or separated by being cut is suppressed. Particularly when the first polymer layer is formed on the anode foil, it is desirable that the coating process is performed such that the first polymer layer is not formed on a cutting line along which the anode foil is to be cut. With this configuration, it is possible to avoid the first polymer component attaching to the cut surface. When the anode foil is cut, the cut surface may include a portion that does not include the dielectric layer. Accordingly, there may be a case where a chemical formation treatment is performed again after the cutting step. In this case as well, the dielectric layer is likely to be formed uniformly on the cut surface.

The first dispersion medium may be removed in the same manner as in the first embodiment.

In the case where the capacitor element is impregnated with a second conductive polymer dispersion liquid (hereinafter referred to as "second dispersion liquid") and/or an electrolytic solution in a step performed later, when the first polymer layer contains the first dispersion medium, the second dispersion liquid and/or the electrolytic solution is induced by the first dispersion medium and easily permeates into the surfaces, pores, and etching pits of the dielectric layers formed on the anode foil and the cathode foil, and the pores of the separator. As a result, an improvement in the self-repairing ability of the anode foil and an increase in the electrostatic capacitance can be expected. Furthermore, cracking is unlikely to occur in the first polymer component even when the long constituent member on which the first polymer layer has been formed is spirally wound into a roll.

(4) Step of Cutting the Constituent Members (S4)

The long constituent member to which the first polymer layer has been formed is cut after the step of forming a first polymer layer. In this case, the first polymer layer is not provided in each cut surface formed on the constituent member, or in other words, each end surface of the constituent member. Other long constituent members may also be cut, for example, in this step. The cutting step may be performed prior to the step of producing a capacitor element or after the step of producing a capacitor element (5) Step of Producing a Capacitor Element (S5)

A capacitor element is produced in the same manner as that of the first embodiment is produced.

(6) Step of Impregnating the Capacitor Element with a Second Dispersion Liquid (S6)

Where necessary, the capacitor element may be impregnated with a second dispersion liquid that contains a second polymer component and a second dispersion medium in the same manner as in the first embodiment.

(Second Dispersion Liquid)

The second dispersion liquid contains, for example, a second polymer component and a second dispersion medium. As the second dispersion liquid, the same as described in the first embodiment can be used.

(7) Step of Impregnating the Capacitor Element with an Electrolytic Solution (S7)

Where necessary, the capacitor element is impregnated with an electrolytic solution in the same manner as in the first embodiment.

(Electrolytic Solution)

The electrolytic solution contains a solvent. As the electrolytic solution, the same as described in the first embodiment can be used.

(8) Step of Sealing the Capacitor Element (S8)

The produced capacitor element is housed into a bottomed case and sealed in the same manner as in the first embodiment Up to here, an example has been described in which the present invention is applied to a spirally wound electrolytic capacitor that includes a capacitor element that includes a cathode foil, but the configuration of the electrolytic capacitor is not limited thereto. The present embodiment is also applicable to, for example, a stacked electrolytic capacitor that includes a capacitor element that includes an anode foil that includes a dielectric layer and a cathode leading layer that covers the anode foil.

The stacked electrolytic capacitor may be produced in the following manner, for example.

A polymer layer is formed on both sides of an anode foil in the same manner as descried above (S3), and then the anode foil is cut into a predetermined shape (S4). In the step of producing a capacitor element (S5), a cathode leading layer is formed so as to cover at least a portion of the conductive polymer layer formed on the surface of the anode foil.

The cathode leading layer is formed by sequentially applying the material of the carbon layer and a metal paste so as to cover the polymer layer, and then performing a drying process. After that, where necessary, the step of impregnating the capacitor element with a second dispersion liquid (S6) and/or the step of impregnating the capacitor element with an electrolytic solution (S7) is performed. Finally, the capacitor element is sealed with a resin sealant by using a molding technique such as injection molding, insert molding, or compression molding, and an electrolytic capacitor is thereby obtained.

[Electrolytic Capacitor]

An electrolytic capacitor according to the present embodiment includes a capacitor element that includes an anode foil that includes a dielectric layer, a cathode foil, and a separator that is interposed between the anode foil and the cathode foil, wherein a first polymer layer that contains a first polymer component is formed on at least one selected from the group consisting of the anode foil, the cathode foil, and the separator. The mass of the first polymer layer per unit area is 0.04 mg/cm$^2$ or more.

Another electrolytic capacitor according to the present embodiment includes a capacitor element that includes an anode foil that includes a dielectric layer and a cathode leading layer that covers the anode foil, wherein a first polymer layer that contains a first polymer component is formed on the anode foil. The cathode leading layer is formed so as to cover at least a portion of the first polymer layer. The mass of the first polymer layer per unit area is 0.1 mg/cm$^2$ or more.

Hereinafter, the constituent members of the capacitor element and other constituent materials will be described.

(First Polymer Layer)

A first polymer layer that contains a first polymer component is formed on at least one constituent member. The first polymer layer is formed by, for example, applying a first dispersion liquid as described above to the constituent member by using a coating method. The first polymer layer may also be formed on the outer surface of the constituent member.

The mass of the first polymer layer is not particularly limited, and may be set as appropriate where necessary. According to the present embodiment, the first polymer layer can be formed on the constituent member in an amount of 0.04 mg/cm$^2$ or more per unit area. In particular, it is preferable that the first polymer layer is formed on the separator in an amount of 0.04 mg/cm$^2$ or more. The amount of the first polymer layer formed on the separator may be 0.1 mg/cm$^2$ or less per unit area. It is preferable that the first polymer layer is formed on each of the anode foil and the cathode foil in an amount of 0.1 mg/cm$^2$ or more. The mass of the first polymer layer formed on each of the anode foil and the cathode foil may be 1 mg/cm$^2$ or less per unit area.

The mass of the first polymer layer per unit area is calculated from the difference in the mass of the constituent member between before and after the application of the first dispersion liquid, or by using a thermogravimetric analysis method (TGA method), as in the first embodiment. With the TGA method, the mass of the first polymer layer attached to the constituent member can be calculated based on the measured values.

As in the first embodiment, the electric conductivity of the first polymer layer may be, for example, 30 S/cm or more, or 300 S/cm or more. Even in the case where a first dispersion liquid that has a first polymer component concentration of 3 mass % or more is used, the electric conductivity of the first polymer layer may be, for example, preferably 170 S/cm or less, 150 S/cm or less, or 120 S/cm or less, as in the first embodiment.

(Second Polymer Layer)

In the capacitor element, a second polymer layer as described above may be provided, as in the first embodiment. By incorporating the second polymer layer, the electrostatic capacitance increases, and a reduction in the ESR can be expected. The second polymer layer is provided in the capacitor element in an amount of, for example, 0.01 mg/cm$^2$ or more and less than 1 mg/cm$^2$.

The second polymer layer may be attached to the surface, pores, and pits of the constituent member of the capacitor element. The second polymer layer may be attached so as to cover at least a portion of the first polymer layer attached to the outer surface of the constituent member. Furthermore, the second polymer layer may be provided in the pits and pores of the constituent member to which the first polymer layer has been attached.

According to the present embodiment, when the constituent member is viewed from the normal direction of the main surface of the constituent member, for example, 50% or more of the area of the main surface is covered by a polymer layer. The polymer layer may include the first polymer layer and the second polymer layer. The area coverage covered by the polymer layer may be 60% or more, and is preferably 90% or more. The polymer layer may be continuous or discontinuous on the surface of the constituent member. The polymer layer that has such a high coverage is likely to be formed when the first dispersion liquid is applied by using a coating method. The area coverage is calculated by using the same method as that used in the first embodiment.

The area coverage of the surface of the constituent member covered by the second polymer layer is smaller than the area coverage covered by the first polymer layer. The area coverage covered by the second polymer layer is, for example, 90% or less, or 60% or less.

The mass (density) of the first polymer layer per unit volume is preferably higher than the mass (density) of the second polymer layer, which is formed on the first polymer layer, per unit area. The density of the first polymer layer is calculated in the same manner as in the first embodiment.

(Anode Foil)

As the anode foil, the same as described in the first embodiment can be used.

In the electrolytic capacitor, a polymer layer may not be formed on the end surfaces of the anode foil. On the other hand, it is desirable that a dielectric layer is formed on the end surfaces of the anode foil.

(Cathode Foil)

As the cathode foil, the same as described in the first embodiment can be used.

(Separator)

The separator is interposed between the anode foil and the cathode foil.

The separator is not particularly limited as long as it is porous. As the separator, a fiber structure such as a woven fabric, a knit, or a non-woven fabric that contains fibers may be used.

The material of the separator is not particularly limited. Examples of the material of the separator include: synthetic fibers such as a nylon fiber, an aramid fiber, an acrylic fiber, and a polyester fiber; cellulose; and the like. Among these, a fiber structure made of cellulose is suitable for use as the separator because it is low cost and has good affinity for the first dispersion liquid.

From the viewpoint of preventing wrinkles, the separator may be the first fiber structure that contains a synthetic fiber or the second fiber structure that contains a cellulose fiber and a paper strengthening agent used in the first embodiment (Cathode Leading Layer)

The cathode leading layer includes, for example, a carbon layer formed so as to cover the first polymer layer and a metal paste layer formed on the surface of the carbon layer. The carbon layer contains a conductive carbon material such as graphite and a resin. The metal paste layer contains, for example, metal particles (for example, silver) and a resin. The configuration of the cathode leading layer is not limited to this configuration. The configuration of the cathode leading layer is not limited as long as it has a current collecting function.

(Resin Sealant)

Figure 3:
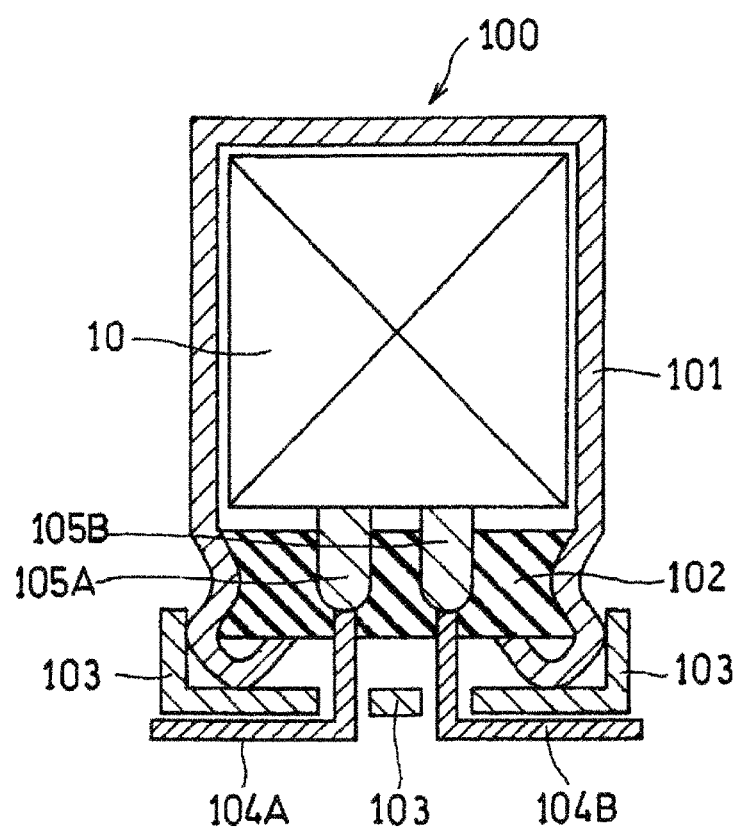
FIG. 3 is a side view schematically showing an electrolytic capacitor according to an embodiment of the present invention.
Figure 4:
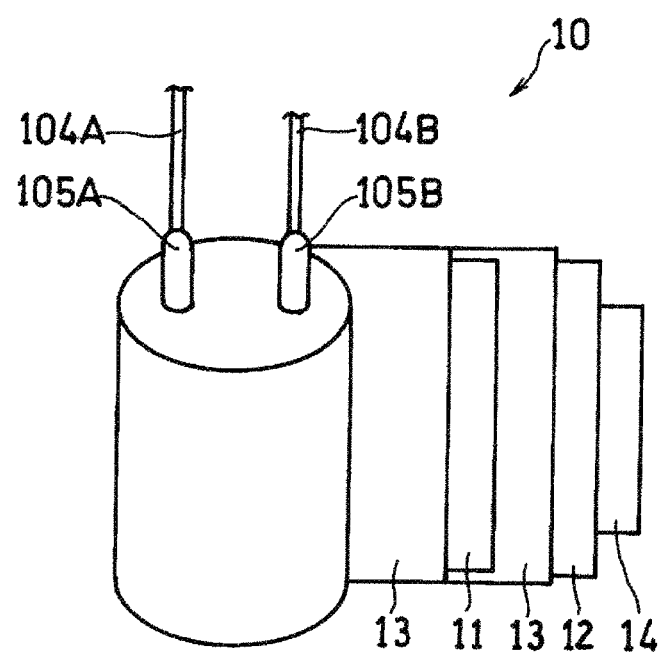
FIG. 4 is a partially exploded oblique view schematically showing a portion of the capacitor element according to the embodiment of the present invention

The resin sealant contains, for example, a thermosetting resin. Examples of thermosetting resin include an epoxy resin, a phenol resin, a silicone resin, a melamine resin, a urea resin, an alkyd resin, polyurethane, polyimide, an unsaturated polyester, and the like. The material of the outer casing may contain a filler, a curing agent, a polymerization initiator, and/or a catalyst FIG. 3 is a schematic cross sectional view of the electrolytic capacitor according to the first and second embodiments of the present embodiment. FIG. 4 is a partially exploded oblique view of a capacitor element included in the electrolytic capacitor.

The electrolytic capacitor includes, for example, a capacitor element 10, a bottomed case 101 that houses the capacitor element 10, a sealing member 102 that closes an opening of the bottomed case 101, a cover plate 103 that covers the sealing member 102, lead wires 104A and 104B that are drawn from the sealing member 102 and pass through the cover plate 103, and lead tabs 105A and 105B that connect the lead wires to electrodes included in the capacitor element 10. The vicinity of the opening end of the bottomed case 101 is squeezed inwardly, and the opening end is curled so as to be clumped onto the sealing member 102.

The capacitor element 10 is, for example, a spirally wound body as shown in FIG. 4. The spirally wound body includes an anode foil 11 connected to the lead tab 105A, a cathode foil 12 connected to the lead tab 105B, and a separator 13. A first polymer layer and a second polymer layer (not shown) are formed on least one of the anode foil 11, the cathode foil 12, and the separator 13.

The anode foil 11 and the cathode foil 12 are spirally wound with the separator 13 interposed therebetween. The outermost layer of the spirally wound body is fixed by using a fixing tape 14. FIG. 4 is a partially exploded view of the spirally wound body before the outermost layer of the spirally wound body is fixed by the fixing tape 14.

The electrolytic capacitor may include at least one capacitor element, or may include a plurality of capacitor elements. The number of capacitor elements included in the electrolytic capacitor may be determined according to the application purpose.

EXAMPLES

Hereinafter, the present invention will be described in further detail by way of examples. However, the present invention is not limited to the examples given below.

Example 1

An electrolytic capacitor with a rated voltage of 35V was produced in the manner described below (a) Preparing Constituent Members An aluminum foil with a thickness of 100 μm was etched so as to roughen the surface of the aluminum foil. A chemical formation treatment was performed on the roughened surface of the aluminum foil to form a dielectric layer, and an anode foil was thereby obtained.

An aluminum foil with a thickness of 50 μm was etched so as to roughen the surface of the aluminum foil, and a cathode foil was thereby obtained.

A non-woven fabric with a thickness of 50 μm was prepared as the raw material of the separator. The non-woven fabric was composed of 50 mass % of a synthetic fiber (compose of 25 mass % of a polyester fiber and 25 mass % of an aramid fiber), and 50 mass % of cellulose, and contained polyacrylamide serving as a paper strengthening agent. The non-woven fabric had a density of 0.35 g/cm$^3$.

(b) Preparing a First Dispersion Liquid

A mixed solution was prepared by dissolving 3,4-ethylenedioxythiophene and polystyrene sulfonic acid (PSS with a weight-average molecular weight of 100,000) in ion exchanged water. Iron sulfate (III) (serving as an oxidizing agent) was added in the mixed solution being stirred, and thereby a polymerization reaction was performed. After that, the reaction solution was dialyzed so as to remove unreacted monomers and the oxidizing agent, and a first dispersion liquid A containing polyethylenedioxythiophene (PEDOT/PSS serving as a first polymer component) doped with about 5 mass % of PSS (serving as a dopant) was thereby obtained.

The concentration of the first polymer component in the first dispersion liquid A was 2 mass %. The viscosity of the first dispersion liquid A measured at room temperature (20° C.) by using a vibration viscometer (VM-100A available from Sekonic Corporation) was 40 mPa·s.

(c) Forming a First Polymer Layer (Producing a Separator)

The first dispersion liquid A was applied to both sides of the fiber structure by using a gravure coater. After that, a drying process was performed, and a separator including the first polymer layer was thereby obtained. The mass of the first polymer layer per unit area of the separator was 0.02 mg/cm$^2$. The area coverage of one of the main surfaces of the separator covered by the first polymer layer was 98%. The electric conductivity of the first polymer layer was 400 S/cm.

(d) Producing a Capacitor Element

The anode foil, the cathode foil, and the separator were cut into predetermined sizes.

An anode lead tab and a cathode lead tab were connected to the anode foil and the cathode foil, and the anode foil and the cathode foil were spirally wound with the separator interposed therebetween together with the lead tabs. An anode lead wire and a cathode lead wire were connected to the end portions of the lead tabs protruding from the spirally wound body, respectively. A chemical formation treatment was again performed on the obtained spirally wound body, and a dielectric layer was formed on the end surfaces of the anode foil. The end portion of the outer surface of the spirally wound body was fixed using a fixing tape, and a capacitor element was thereby obtained.

(e) Preparing a Second Dispersion Liquid and Impregnation

A mixed solution was prepared by dissolving 3,4-ethylenedioxythiophene and polystyrene sulfonic acid (PSS with a weight-average molecular weight of 100,000) in ion exchanged water. Iron sulfate (III) (serving as an oxidizing agent) was added in the mixed solution being stirred, and thereby a polymerization reaction was performed. After that, the reaction solution was dialyzed so as to remove unreacted monomers and the oxidizing agent, and a second dispersion liquid containing polyethylenedioxythiophene (PEDOT/PSS serving as a second polymer component) doped with about 5 mass % of PSS (serving as a dopant) was thereby obtained.

The concentration of the second polymer component in the second dispersion liquid was 1.5 mass %. The viscosity of the second dispersion liquid measured at room temperature (20° C.) by using a vibration viscometer (VM-100A available from Sekonic Corporation) was 30 mPa·s.

The capacitor element was immersed in the second dispersion liquid under reduced atmosphere (40 kPa) for five minutes, and then subjected to a drying process. A second polymer layer was thereby formed.

(f) Impregnation with an Electrolytic Solution

Ethylene glycol (EG) was prepared as a solvent. An electrolytic solution was prepared by dissolving, in EG, 5-sulfosalicylic acid (divalent acid component) serving as a second sulfonic acid and trimethylamine serving as a basic component at a concentration of 25 mass % in total. The equivalence ratio of 5-sulfosalicylic acid relative to triethylamine was set to 2.0.

The capacitor element was immersed in the electrolytic solution under reduced atmosphere (40 kPa) for five minutes after the capacitor element had been impregnated with the second dispersion liquid.

(g) Sealing the Capacitor Element

The capacitor element impregnated with the electrolytic solution was sealed, and an electrolytic capacitor (A1) as shown in FIG. 3 was obtained. After that, the capacitor element was subjected to aging at 95° C. for 90 minutes while applying the rated voltage.

<Evaluation>

The electrolytic capacitor A1 that had been subjected to aging was measured for electrostatic capacitance and ESR (with the measurement temperature being set to 20° C.). The evaluation results are shown as relative values with respect to the electrostatic capacitance and the ESR of an electrolytic capacitor B1 produced in Comparative Example 1.

After the electrostatic capacitance and the ESR had been measured, the electrolytic capacitor A1 was disassembled, and each constituent member was taken out therefrom. The mass of the second polymer layer per unit area in the entire capacitor element was 0.07 mg/cm². The area coverage of one of the main surfaces of the separator covered by the second polymer layer was 83%.

Furthermore, a cross section of the separator was observed by using an SEM, and the mass of the first polymer layer per unit area and the mass of the second polymer layer per unit area were calculated. The mass of the first polymer layer per unit area was higher than the mass of the second polymer layer per unit area.

Example 2

An electrolytic capacitor A2 was produced in the same manner as in Example 1, except that, in the step (c) of forming a first polymer layer, the first dispersion liquid A was also applied to both sides of the anode foil by using a gravure coater in addition to the fiber structure, and the produced electrolytic capacitor was evaluated in the same manner. The results are shown in Table 1.

The mass of the first polymer layer formed on the anode foil per unit area was 0.3 mg/cm². The area coverage of one of the main surfaces of the anode foil covered by the first polymer layer was 99%.

Example 3

An electrolytic capacitor A3 was produced in the same manner as in Example 1, except that, in the step (c) of forming a first polymer layer, the first dispersion liquid A was also applied to both sides of the cathode foil by using a gravure coater in addition to the fiber structure, and the produced electrolytic capacitor was evaluated in the same manner. The results are shown in Table 1. The mass of the first polymer layer formed on the cathode foil per unit area was 0.3 mg/cm². The area coverage of one of the main surfaces of the cathode foil covered by the first polymer layer was 99%.

Comparative Example 1

An electrolytic capacitor B1 was produced in the same manner as in Example 1, except that the step (c) of forming a first polymer layer was not performed, and the produced electrolytic capacitor was evaluated in the same manner. The results are shown in Table 1.

TABLE 11

| Electrolytic capacitor | Electrostatic capacitance | ESR |
|---|---|---|
| A1 | 1.01 | 0.96 |
| A2 | 1.01 | 0.94 |
| A3 | 1.02 | 0.93 |
| B1 | 1 | 1 |

Example 4

A first dispersion liquid B was prepared in the same manner as in Example 1, except that, in the step (b) of preparing a first dispersion liquid, PSS with a weight-average molecular weight of 50,000 was used. The concentration of the first polymer component in the first dispersion liquid B was 4 mass %. The viscosity of the first dispersion liquid B measured at room temperature (20° C.) by using a vibration viscometer (VM-100A available from Sekonic Corporation) was 105 mPa·s.

An electrolytic capacitor A4 was produced in the same manner as in Example 1, except that the first dispersion liquid B was used, and the produced electrolytic capacitor was evaluated in the same manner. The results are shown in Table 1.

The mass of the first polymer layer formed on the separator per unit area was 0.04 mg/cm². The area coverage of one of the main surfaces of the separator covered by the first polymer layer was 98%. The electric conductivity of the first polymer layer was 150 S/cm. The area coverage of one of the main surfaces of the separator covered by the second polymer layer was 83%.

Example 5

An electrolytic capacitor A5 was produced in the same manner as in Example 2, except that the first dispersion liquid B was used, and the produced electrolytic capacitor was evaluated in the same manner. The results are shown in Table 2.

The mass of the polymer layer formed on the anode foil per unit area was 0.4 mg/cm$^2$, and the mass of the polymer layer formed on the separator per unit area was 0.04 mg/cm$^2$. The area coverage of one of the main surfaces of the anode foil covered by the first polymer component was 99%, and the area coverage of one of the main surfaces of the separator covered by the first polymer layer was 98%. The area coverage of one of the main surfaces of each of the anode foil and the separator covered by the second polymer component was 83%.

Example 6

An electrolytic capacitor A6 was produced in the same manner as in Example 3, except that the first dispersion liquid B was used, and the produced electrolytic capacitor was evaluated in the same manner. The results are shown in Table 2.

The mass of the first polymer layer formed on the cathode foil per unit area was 0.4 mg/cm$^2$, and the mass of the first polymer layer formed on the separator per unit area was 0.04 mg/cm$^2$. The area coverage of one of the main surfaces of the cathode foil covered by the first polymer component was 99%, and the area coverage of one of the main surfaces of the separator covered by the first polymer layer was 98%. The area coverage of one of the main surfaces of each of the cathode foil and the separator was 83%.

Example 7

An electrolytic capacitor A7 was produced in the same manner as in Example 4, except that, in the step (c) of forming a first polymer layer, the first dispersion liquid B was also applied to both sides of each of the anode foil and the cathode foil by using a gravure coater in addition to the fiber structure, and the produced electrolytic capacitor was evaluated in the same manner. The results are shown in Table 2.

The mass of the first polymer layer formed on each of the anode foil and the cathode foil per unit area was 0.4 mg/cm$^2$, and the mass of the first polymer layer formed on the separator per unit area was 0.04 mg/cm$^2$. The area coverage of one of the main surfaces of each of the anode foil and the cathode foil covered by the first polymer layer was 99%, and the area coverage of one of the main surfaces of the separator covered by the first polymer layer was 98%. The area coverage of one of the main surfaces of each of the anode foil, the cathode foil, and the separator covered by the second polymer layer was 83%.

TABLE 2

| Electrolytic capacitor | Electrostatic capacitance | ESR |
|---|---|---|
| A4 | 1.01 | 0.94 |
| A5 | 1.01 | 0.91 |
| A6 | 1.03 | 0.91 |
| A7 | 1.04 | 0.87 |
| B1 | 1 | 1 |

Example 8

An electrolytic capacitor A8 was produced in the same manner as in Example 1, except that, as the raw material of the separator, a 90 μm thick non-woven fabric (with a density of 0.35 g/cm$^3$) containing 50 mass % of a synthetic fiber (composed of 25 mass % of a polyester fiber and 25 mass % of an aramid fiber) and 50 mass % of cellulose, and polyacrylamide serving as a paper strengthening agent was used, and the produced electrolytic capacitor was evaluated in the same manner. The results are shown in Table 3. The evaluation results are shown as relative values with respect to the electrostatic capacitance and the ESR of an electrolytic capacitor B2 produced in Comparative Example 2. The area coverage of one of the main surfaces of the separator covered by the first polymer layer was 99%.

After the electrostatic capacitance and the ESR had been measured, the electrolytic capacitor A8 was disassembled, and each constituent member was taken out therefrom. The mass of the second polymer layer per unit area in the entire capacitor element was 0.07 mg/cm$^2$. The area coverage of one of the main surfaces of the separator covered by the second polymer layer was 83%.

Furthermore, a cross section of the separator was observed by using an SEM, and the mass of the first polymer layer per unit area and the mass of the second polymer layer per unit area were calculated. The mass of the first polymer layer per unit area was higher than the mass of the second polymer layer per unit area.

Comparative Example 2

An electrolytic capacitor B2 was produced in the same manner as in Example 8, except that the first dispersion liquid was not applied to the fiber structure, and the produced electrolytic capacitor was evaluated in the same manner. The results are shown in Table 3.

TABLE 3

| Electrolytic capacitor | Electrostatic capacitance | ESR |
|---|---|---|
| A8 | 1.01 | 1.98 |
| B2 | 1 | 2.05 |

Example 9

A capacitor element and an electrolytic capacitor A9 were produced in the same manner as in Example 1, except that, in the step (c) of forming a first polymer layer, the first dispersion liquid B prepared in Example 4 was applied to both sides of the anode foil instead of the fiber structure, and the produced electrolytic capacitor was evaluated in the same manner. The results are shown in Table 4.

The mass of the first polymer layer per unit area was 0.4 mg/cm$^2$. The area coverage of one of the main surfaces of the anode foil covered by the first polymer layer was 99%. The electric conductivity of the first polymer layer was 150 S/cm. The mass of the second polymer layer per unit area in the entire capacitor element was 0.07 mg/cm$^2$. The area coverage of one of the main surfaces of the anode foil covered by the second polymer layer was 83%.

Furthermore, a cross section of the anode foil was observed by using an SEM, and the mass of the first polymer layer per unit area and the mass of the second polymer layer per unit area were calculated. The mass of the first polymer layer per unit area was higher than the mass of the second polymer layer per unit area.

Example 10

A capacitor element and an electrolytic capacitor A10 were produced in the same manner as in Example 1, except that, in the step (c) of forming a first polymer layer, the first dispersion liquid B prepared in Example 4 was applied to both surfaces of the cathode foil instead of the fiber structure, and the produced electrolytic capacitor was evaluated in the same manner. The results are shown in Table 4.

The mass of the first polymer layer formed on the cathode foil per unit area was 0.4 mg/cm². The area coverage of one of the main surfaces of the cathode foil covered by the first polymer layer was 99%. The area coverage of one of the main surfaces of the cathode foil covered by the second polymer layer was 83%.

Example 11

A capacitor element and an electrolytic capacitor A11 were produced in the same manner as in Example 1, except that, in the step (c) of forming a first polymer layer, the first dispersion liquid B prepared in Example 4 was applied to both sides of each of the anode foil and the cathode foil instead of the fiber structure, and the produced electrolytic capacitor was evaluated in the same manner. The results are shown in Table 4.

The mass of the polymer layer formed on each of the anode foil and the cathode foil per unit area was 0.4 mg/cm². The area coverage of one of the main surfaces of each of the anode foil and the cathode foil covered by the first polymer component was 99%. The area coverage of one of the main surfaces of each of the anode foil and the cathode foil covered by the second polymer component was 83%.

TABLE 4

| Electrolytic capacitor | Electrostatic capacitance | ESR |
|---|---|---|
| A9 | 1.01 | 0.93 |
| A10 | 1.03 | 0.92 |
| A11 | 1.03 | 0.90 |
| B1 | 1 | 1 |

Industrial Applicability

The present invention is suitable particularly for use in an electrolytic capacitor through which a high ripple current flows.

The present invention has been described in terms of the presently preferred embodiments, but the disclosure should not be interpreted as limiting. Various alterations and modifications will no doubt become apparent to those skilled in the art to which the invention pertains, after having read the disclosure. Accordingly, it is to be understood that the appended claims be interpreted as covering all alterations and modifications which fall within the true spirit and scope of the present invention.

REFERENCE SIGNS LIST

100: electrolytic capacitor
101: bottomed case
102: sealing member
103: cover plate
104A, 104B: lead wire
105A, 105B: lead tab
10: capacitor element
11: anode foil
12: cathode foil
13: separator
14: fixing tape

The invention claimed is:

1. A method for producing an electrolytic capacitor, the method comprising the steps of:
preparing an anode foil that includes a dielectric layer, a cathode foil, and a fiber structure;
preparing a conductive polymer dispersion liquid that contains a conductive polymer component and a dispersion medium;
producing a separator by applying the conductive polymer dispersion liquid to the fiber structure and then removing at least a portion of the dispersion medium, wherein a mass of the conductive polymer component per unit area of the separator is 0.02 mg/cm² or more; and
producing a capacitor element by sequentially stacking the anode foil, the separator, and the cathode foil,
wherein the dispersion medium contains water,
the fiber structure contains a synthetic fiber in an amount of 50 mass % or more, and
the fiber structure has a density of 0.2 g/cm³ or more and less than 0.45 g/cm³.

2. The method for producing an electrolytic capacitor in accordance with claim 1,
wherein the synthetic fiber comprises at least one selected from the group consisting of a nylon fiber, an aramid fiber, an acrylic fiber, and a polyester fiber.

3. The method for producing an electrolytic capacitor in accordance with claim 1,
wherein the fiber structure contains a cellulose fiber in an amount of 10 mass % or more and less than 50 mass %.

4. The method for producing an electrolytic capacitor in accordance with claim 1,
wherein, in the step of producing the separator, the conductive polymer dispersion liquid is applied to the fiber structure by using a coating method.

5. The method for producing an electrolytic capacitor in accordance with claim 1,
wherein the conductive polymer component is contained in the conductive polymer dispersion liquid in an amount of 1 mass % or more and 15 mass % or less, and the conductive polymer dispersion liquid has a viscosity of 10 mPa·s or more, the viscosity being measured at room temperature by using a vibration viscometer.

6. A method for producing an electrolytic capacitor, the method comprising the steps of:
preparing an anode foil that includes a dielectric layer, a cathode foil, and a fiber structure;
preparing a conductive polymer dispersion liquid that contains a conductive polymer component and a dispersion medium;
producing a separator by applying the conductive polymer dispersion liquid to the fiber structure and then removing at least a portion of the dispersion medium, wherein a mass of the conductive polymer component per unit area of the separator is 0.02 mg/cm² or more; and
producing a capacitor element by sequentially stacking the anode foil, the separator, and the cathode foil,
wherein the dispersion medium contains water,
the fiber structure contains 40 mass % or more of a cellulose fiber and a paper strengthening agent, and
the fiber structure has a density of 0.2 g/cm³ or more and less than 0.45 g/cm³.

7. The method for producing an electrolytic capacitor in accordance with claim 6,
wherein the paper strengthening agent comprises at least one selected from the group consisting of a urea formaldehyde resin, a melamine formaldehyde resin, a polyamide polyamine epichlorohydrin, and a polyvinylamine.

8. The method for producing an electrolytic capacitor in accordance with claim 6,
wherein the paper strengthening agent comprises at least one selected from the group consisting of a polyacrylamide, a polyvinyl alcohol, a starch, and a carboxymethyl cellulose.

9. The method for producing an electrolytic capacitor in accordance with claim 6,
wherein the fiber structure contains a synthetic fiber.

10. The method for producing an electrolytic capacitor in accordance with claim 6,
wherein, in the step of producing the separator, the conductive polymer dispersion liquid is applied to the fiber structure by using a coating method.

11. The method for producing an electrolytic capacitor in accordance with claim 6,
wherein the conductive polymer component is contained in the conductive polymer dispersion liquid in an amount of 1 mass % or more and 15 mass % or less, and
the conductive polymer dispersion liquid has a viscosity of 10 mPa·s or more, the viscosity being measured at room temperature by using a vibration viscometer.

12. An electrolytic capacitor comprising:
an anode foil that includes a dielectric layer;
a cathode foil; and
a separator that is interposed between the anode foil and the cathode foil,
wherein the separator contains a fiber structure and a conductive polymer component that is attached to the fiber structure,
the fiber structure contains a synthetic fiber in an amount of 50 mass % or more, and
the fiber structure has a density of 0.2 g/cm$^3$ or more and less than 0.45 g/cm$^3$,
wherein a mass of the conductive polymer component per unit area of the separator is 0.02 mg/cm$^2$ or more.

13. An electrolytic capacitor comprising:
an anode foil that includes a dielectric layer;
a cathode foil; and
a separator that is interposed between the anode foil and the cathode foil,
wherein the separator contains a fiber structure and a conductive polymer component that is attached to the fiber structure,
the fiber structure contains 40 mass % or more of a cellulose fiber and a paper strengthening agent, and
the fiber structure has a density of 0.2 g/cm$^3$ or more and less than 0.45 g/cm$^3$,
wherein a mass of the conductive polymer component per unit area of the separator is 0.02 mg/cm$^2$ or more.

14. A method for producing an electrolytic capacitor, the method comprising the steps of:
preparing a sheet-like member that constitute a capacitor element;
preparing a first conductive polymer dispersion liquid that contains a first conductive polymer component and a first dispersion medium, wherein the first conductive polymer component is contained in an amount of 3 mass % or more and 15 mass % or less, and the first conductive polymer dispersion liquid has a viscosity of 100 mPa·s or more, the viscosity being measured at room temperature by using a vibration viscometer;

forming a conductive polymer layer that contains the first conductive polymer component by applying the first conductive polymer dispersion liquid to the sheet-like member by using a coating method and then removing at least a portion of the first dispersion medium; and
producing a capacitor element by using the sheet-like member on which the conductive polymer layer has been formed,
wherein a mass of the first conductive polymer component per unit area of the sheet-like member is 0.02 mg/cm$^2$ or more.

15. The method for producing an electrolytic capacitor in accordance with claim 14,
wherein the viscosity of the first conductive polymer dispersion liquid is 200 mPa·s or less.

16. The method for producing an electrolytic capacitor in accordance with claim 14,
wherein the first conductive polymer component contains a polyanion, and
the polyanion has a weight-average molecular weight of 1,000 or more and 70,000 or less.

17. The method for producing an electrolytic capacitor in accordance with claim 14, comprising the step of impregnating the produced capacitor element with an electrolytic solution.

18. The method for producing an electrolytic capacitor in accordance with claim 14, comprising the step of impregnating the produced capacitor element with a second conductive polymer dispersion liquid,
wherein the second conductive polymer dispersion liquid contains a second conductive polymer component and a second dispersion medium,
the second conductive polymer component is contained in an amount of 0.5 mass % or more and less than 3 mass %, and
the second conductive polymer dispersion liquid has a viscosity of less than 100 mPa s, the viscosity being measured at room temperature by using a vibration viscometer.

19. The method for producing an electrolytic capacitor in accordance with claim 14,
wherein, in the step of forming a conductive polymer layer, the conductive polymer layer that contains the first conductive polymer component and the first dispersion medium is formed by removing a portion of the first dispersion medium.

20. The method for producing an electrolytic capacitor in accordance with claim 14,
wherein a mass of the first conductive polymer component per unit area of the sheet-like member is 0.04 mg/cm$^2$ or more.

21. An electrolytic capacitor comprising:
a capacitor element that includes: an anode foil that includes a dielectric layer; a cathode foil; and a separator that is interposed between the anode foil and the cathode foil,
wherein a conductive polymer layer that contains a first conductive polymer component is formed on at least one selected from the group consisting of the anode foil, the cathode foil, and the separator, and
a mass of the conductive polymer layer per unit area is 0.04 mg/cm$^2$ or more.

22. The electrolytic capacitor in accordance with claim 21, wherein the conductive polymer layer has an electric conductivity of 170 S/cm or less.

* * * * *